US005140734A

United States Patent [19]

Taggart

[11] Patent Number: 5,140,734

[45] Date of Patent: Aug. 25, 1992

[54] BRAKE SPRING PLIERS

[75] Inventor: Kenneth J. Taggart, Columbia, Pa.

[73] Assignee: Easco Hand Tools, Inc., Lancaster, Pa.

[21] Appl. No.: 639,006

[22] Filed: Jan. 9, 1991

[51] Int. Cl.[5] .............................................. B23P 19/04

[52] U.S. Cl. ........................................ 29/227; 81/421; 29/225; 29/268

[58] Field of Search ................ 29/225, 227, 267, 268, 29/270, 278; 269/6; 81/421-423

[56] References Cited

U.S. PATENT DOCUMENTS

| | | | |
|---|---|---|---|
| 1,686,640 | 10/1928 | Pierce, Jr. | 81/423 |
| 2,274,981 | 3/1942 | Grubb | 29/227 |
| 3,104,568 | 9/1963 | Patton | 81/421 |
| 3,172,133 | 3/1965 | Rizzo | 81/421 |
| 5,003,680 | 4/1991 | Vesely et al. | 29/227 |

*Primary Examiner*—J. J. Swann

*Attorney, Agent, or Firm*—Leonard Bloom

[57] ABSTRACT

An adjustable brake spring pliers that are readily adjustable for use on either shoe of both old and new types of brake drums of varying sizes. The pliers has a pair of pivotally joined arms. One of the arms has a flat portion formed thereon that minimizes the potential of damage to the brake lining contacted by the flat portion during use of the pliers. The other of the arms includes a pair of pivotal tips formed thereon. Each of the tips have a respective notch formed th erein for engaging a spring to be installed/removed thereby. The tips may be readily selectively adjusted, permitting the pliers to be utilized on brake drums of varying sizes and types.

9 Claims, 5 Drawing Sheets

BRAKE SPRING PLIERS

FIELD OF THE INVENTION

The present invention relates to brake spring pliers and, more particularly, to devices for the removal and installation of brake springs from the brake assemblies of motor vehicles.

BACKGROUND OF THE INVENTION

Traditionally, devices for the removal and installation of springs from the brake assemblies of motor vehicles include a pair of pivoted scissor-like arms. The end of one arm is formed at a right angle to the arm, having a pointed end thereon. The end of the other arm includes an arcuate hook that is directed inwardly toward the one arm of the device. The end of the handle of the device is adapted to release the spring at the top of an old style brake drum by engaging a connector and turning it. In use, the arms of the device are opened to place the hook of the other arm between the end of the spring and the shoe of the drum, the pointed end of the one arm being in contact with the brake lining located on the opposite side of the brake shoe.

Examples of such traditional brake spring pliers are disclosed in U.S. Pat. Nos. 1,938,102 issued to Hill; 1,953,930 issued to Dyal; and 2,264,391 issued to MacLeod. A similar device that also applies pressure with an arm having a pointed hook formed thereon is disclosed in U.S. Pat. No. 2,474,940 issued to Hansen.

While being useful for their purpose, use of such devices can easily result in the pointed end thereof damaging the brake lining, especially when applying pressure therewith. Such a problem is emphasized by the fact that such linings are relatively susceptible to being damaged and are quite expensive to replace.

In an attempt to solve this problem, several devices, arrangements and methods of which I am aware, wherein the device does not touch the brake lining during use, have been disclosed in the following United States Letters Patent:

| U.S. Pat. No. | Inventor(s) | Year of Issue |
|---|---|---|
| 1,917,878 | O'Donnell | 1933 |
| 1,949,343 | Wood | 1934 |
| 2,042,287 | Allievi, et al. | 1936 |
| 2,274,981 | Grubb | 1942 |
| 2,489,434 | Riccio | 1949 |
| 2,507,622 | Brugmann | 1950 |
| 2,666,256 | White | 1954 |
| 2,839,820 | Bates | 1958 |
| 3,355,791 | Castoe | 1967 |
| 3,602,973 | Mata | 1971 |
| 3,891,185 | Lett | 1975 |
| 4,064,978 | Wunderlich | 1977 |
| 4,870,737 | Navarro | 1989 |

Unfortunately, each of the above-mentioned references has one or more drawbacks in that they either: exert pressure on the brake shoes, etc., of the brake assembly, which elements are ill-adapted to withstand such pressure; or, they fail to provide the beneficial leverage that is provided by having a fulcrum, an element that is especially important when removing high tension springs, such as those found in, for example, large trucks.

Additionally, none of the device, arrangements and/or methods noted above are adjustable, so that the hooks thereof that are provided may be oriented for use on either shoe of the drum. Thus, they may only be used on one of the shoes. This limits the applicability and use of these devices.

Recently, a new type of brake drum has also been employed. The brake springs of these new type of brake drums are positioned and attached differently than those of the old type of brake drums. These differences between the old and the new types of brake drums means that the devices noted above, which are designed for use only with the old type of brake drum, are not readily adaptable to be utilized on the new type of brake drums.

Finally, it is noted that the devices disclosed in the above-noted references are not readily adjustable for use with both the old and the new types of brake drums, as well as for use with brake drums of different sizes.

Accordingly, it can be seen that there remains a need for a brake spring pliers that provides a fulcrum for providing the desired leverage for installation/removal of a brake spring, which pliers minimize the potential of damaging the brake lining, and which pliers are readily adjustable, so as to be adaptable for use on both old and new types of brake drums of varying sizes and designs.

SUMMARY OF THE INVENTION

It is a primary object of the present invention to provide a brake spring pliers that are readily selectively adjustable for easy use with both old and new types of brake drums.

It is another primary object of the present invention to provide such a brake spring pliers that are readily adjustable for easy use with brake drums of varying sizes.

It is still another object of the present invention to provide such a brake spring pliers that provides an arrangement that minimizes the potential for damaging the brake lining while still providing the necessary fulcrum for the desired leverage for installation/removal of the brake springs of brake drums.

It is a still further object of the present invention to provide such a brake spring pliers that permits the use thereof on either shoe of the brake drum.

In accordance with the teachings of the present invention, there is disclosed an adjustable brake spring pliers. These pliers have a pair of scissor-like arms. Each of the arms has a respective forward end and a respective rearward handle end. The arms are joined together at a pivot point. In this manner, the arms may be pivoted relative to one another in a first direction or in a second opposite direction. In the first direction, the forward ends of the arms are moved towards one another. In the second opposite direction, the forward ends of the arms are moved away from one another. The forward end of one of the arms includes a flat portion. During use, this flat portion contacts and presses against the brake lining of a brake shoe for providing the necessary fulcrum for the desired leverage needed for the pliers proper operation. In this fashion, the brake lining is protected from damage during use of the pliers. The forward end of the other of the arms includes a notch that is formed therein. This notch is provided for engaging the brake spring to be removed/installed by the use of the pliers.

In a preferred embodiment, a plate is positioned substantially parallel to the foot and a rod extends between the plate and the foot being integral therewith. The rod is further disposed extending through the forward end of the one of the arms and the plate. Finally, a spring is disposed between and bearing against the plate and the forward end of the one of the arms. In this manner, the foot is constantly resiliently biased in a direction away from the forward end of the other of the arms. Provision of such a foot provides the brake lining with further protection and further minimizes the potential for damaging the brake lining.

In still another preferred embodiment, means is provided for selectively positioning and securing the notch of the other of the arms in a selected pivoted position. In such an embodiment, at least one (a first) tip is pivotally carried by the forward portion of the other of the arms for pivotal movement of the tip in opposite directions towards and away from the one of the arms. The tip has a notch formed therein for engaging the brake spring to be installed/removed thereby. Finally means is provided for selectively adjusting and securing the tip in a selected pivoted position. In this fashion, the tip having the notch may be selectively pivotally adjusted and secured in a desired selected position. Such features make the pliers readily selectively adjustable for easy use with both old and new type brake drums of varying sizes.

In still yet another preferred embodiment, the forward end of the other of the arms further includes a second tip that is pivotally joined thereto on an opposite side thereof from the first tip. In this manner, selective pivotal movement of the tips in respective opposite directions towards and away from the one of the arms is provided. Each of the tips has a respective notch formed therein for selectively engaging the brake spring to be installed/removed thereby. Finally, means is provided for selectively securing the tips in respective selected pivoted positions. In this fashion, the tips having the hooks may be selectively pivotally adjusted and secured in a desired position for use on brake springs of brake shoes that are located on either side of a brake drum.

These and other objects and advantages of the present invention will become readily apparent from a reading of the following description, when taken in conjunction with the enclosed drawings.

BRIEF DESCRIPTIONS OF THE DRAWINGS

Figure 7A:
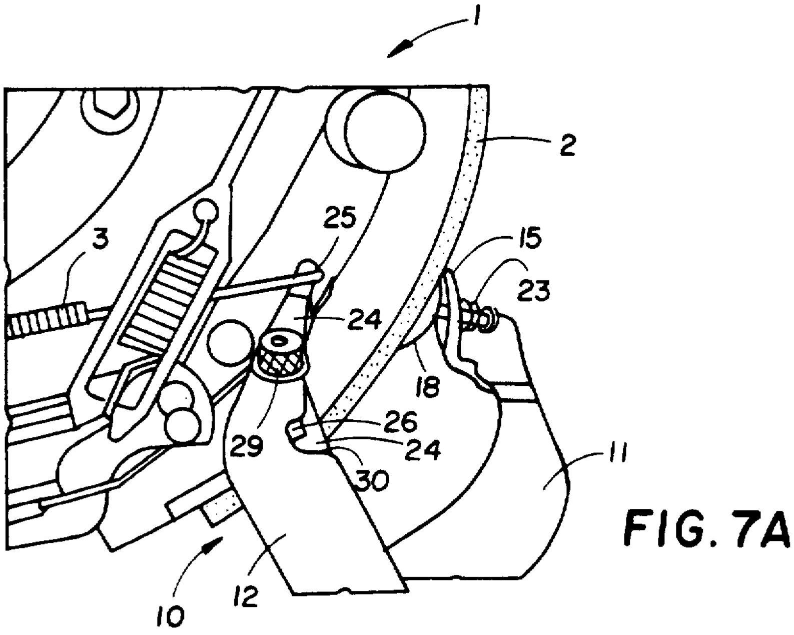

FIG. 7*a* illustrates the brake spring pliers of the present invention being utilized on a brake spring of a first brake shoe on one side of an old type of brake drum.

Figure 7B:
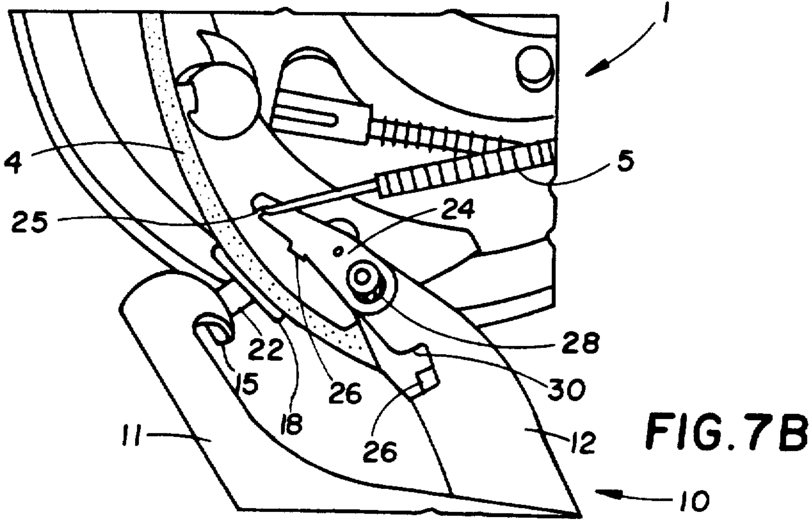

FIG. 7*b* illustrates the brake spring pliers of the present invention being utilized on a brake spring of a second brake shoe on the other side of an old type of brake drum.

Figure 8A:
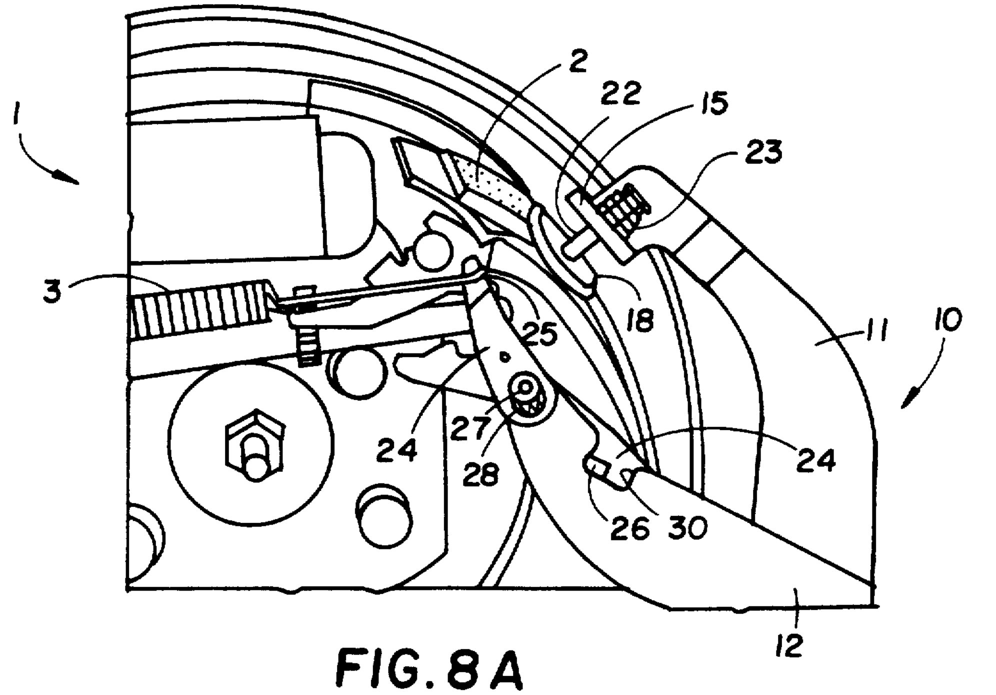

FIG. 8*a* illustrates the brake spring pliers of the present invention being utilized on a brake spring of a first brake shoe on one side of a new type of brake drum.

Figure 8B:
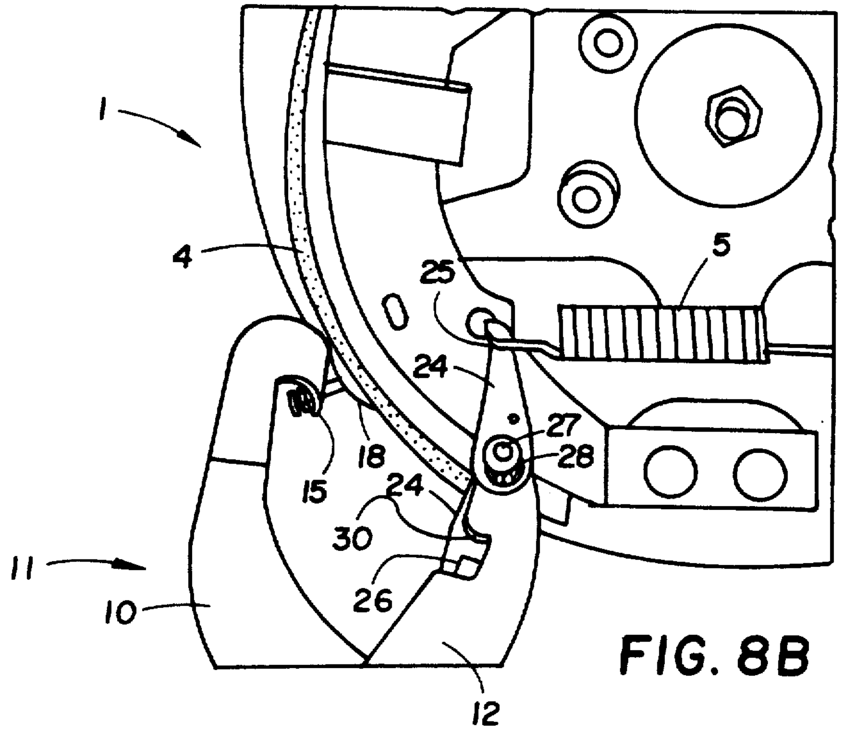

FIG. 8*b* illustrates the brake spring pliers of the present invention being utilized on a brake spring of a second brake shoe on the other side of a new type of brake drum.

DESCRIPTION OF PREFERRED EMBODIMENTS

With reference now to the drawings, and in particular FIGS. 1-4, the adjustable brake spring pliers 10 of the present invention includes a pair of scissor-like arms 11 and 12, each of which is formed extending along respective parallel lonitudinal axes. Each of the arms 11 and 12 has a respective forward end and a rearward end. The forward ends of the arms 11 and 12 carry the working tools thereon. The rearward handle ends are gripped by the user of the device 10 during the use thereof to remove/install the brake springs from the brake shoes on either side of either an old type or new type of drum brake.

The arms 11 and 12 are joined together at a pivot point 13 that is located between the respective forward and rearward ends of the arms 11 and 12. Preferably, this pivot point 13 is located substantially intermediate of the said forward and rearward ends. These arms 11 and 12 may be pivotably joined to one another at the pivot point 13 by any suitable means, such as a semi-tubular rivet.

Pivotally joined to one another as described above, the arms 11 and 12 may be pivoted in opposite directions relative to one another. Pivoting the arms 11 and 12 in a first direction moves the forward ends of the arms 11 and 12 towards one another for positioning of the device 10 and/or for releasing the tension on a brake spring being removed from/installed on the brake drum. Pivoting the arms 11 and 12 in a second opposite direction moves the forward ends of the arms 11 and 12 away from one another for pulling a brake spring, thereby creating tension on the brake spring being installed on/removed from the brake drum.

The forward end of the one of the arms 11 has a first right angle bend 14 formed therein. This first right angle bend 14 extends along a longitudinal axis that is substantially perpendicular to the longitudinal axis of the arm 11. In this fashion, the first right angle bend extends in a direction towards the other of the arms 12.

The forward end of the one of the arms 11 further has a second right angle bend 15 formed therein. This second right angle bend 15 is formed extending along a longitudinal axis that is substantially perpendicular to both the longitudinal axis of the arm 11 and that of the first right angle bend 14. In this fashion, the second right angle bend 15 extends laterally of the one of the arms 11, so as to be located positioned substantially over the forward end of the other of the arms 12.

The second right angle bend 15 has an aperature 16 formed therethrough.

It is also noted that the forward end of the one of the arms 11 further has a substantially 45° bend (relative to the longitudinal axis of the arm 11) 17 formed therein between the first right angle bend 14 and the remainder of the arm 11 located rearwardly of the bend 14. This 45° bend 17 extends outwardly away from the other of the arms 12. This bend 17 permits the second right angle bend 15 to be positioned so as to extend over the forward end of the other of the arms 12.

Carried by the second right angle bend 15 of the forward end of the one of the arms 11 is a foot 18. Carried thusly, the foot 18 is positioned substantially over the forward end of the other of the arms 12. The foot 18 includes a flat portion 19 that is disposed so as to be substantially parallel to the second right angle bend 15. During use of the device 10, the flat portion 19 of the foot 18 contacts and presses against the lining on the outside of the brake shoe of a brake drum. In this fashion, the flat portion 19 provides an arrangement that, unlike the pointed ends provided by the prior art devices, minimizes the potential damage that may be sustained by the brake lining during use of the device 10.

The foot 18 further includes a pair of prongs 20 formed thereon. These prongs are aligned being substantially parallel to the flat portion 19, so as once again to minimize potential damage to the brake lining. The foot is substantially aligned with the aperture 16.

Means is also provided to constantly resiliently bias the foot in a direction away from the other of the arms 12.

A plate 21 is positioned substantially parallel to the flat portion 19 of the foot 18. This plate 21 is further positioned on an opposite side of the second right angle bend 15 from the foot 18, being substantially aligned with the aperature 16 formed in the bend 15.

A rod 22 extends between the plate 21 and the foot 18. This rod 22 is aligned on a repective longitudinal axis that is substantially perpendicular to both the plate 21 and the foot 18. So positioned, the rod 22 extends through the aperture 16 having one end thereof being integral with the plate 22 and a second opposite end being integral with the foot 18.

A resilient biasing spring 23 is disposed between and abuts the second bend 15 of the forward end of the one of the arms 11 and the plate 21. In this manner, the spring insures that the foot 18 is constantly resiliently biased in a direction away from the forward end of the other of the arms 12. Preferably, the spring 23 is a coil spring that is disposed surrounding the rod 22. In this manner, the rod 22 retains the spring 23 in place. This arrangement of the rod 22, the spring 23 and the second bend 15, allows the foot 18 to swivel and self-align.

Figure 1:
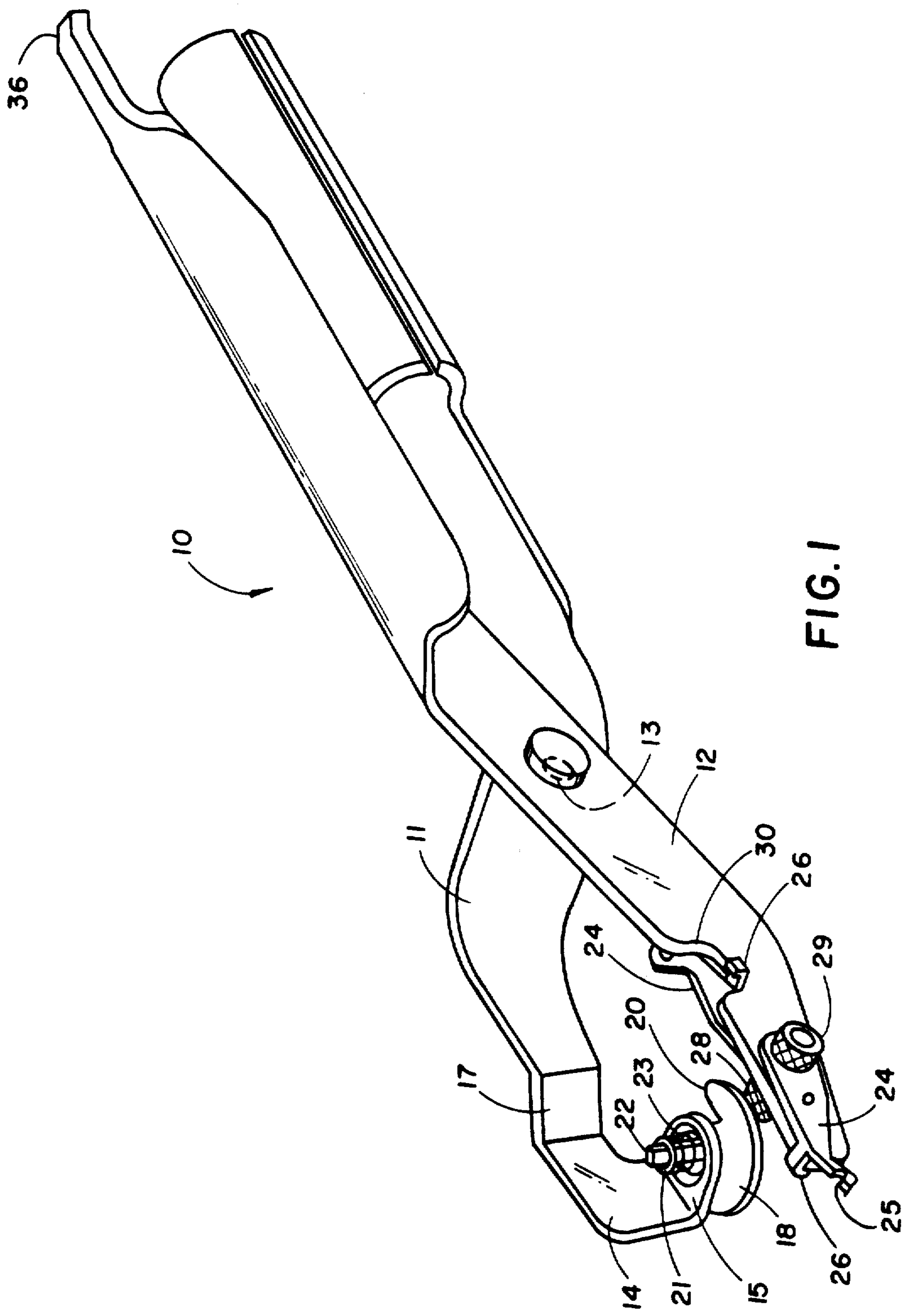
FIG. 1 is a perspective view of the brake spring pliers of the present invention.
Figure 2:
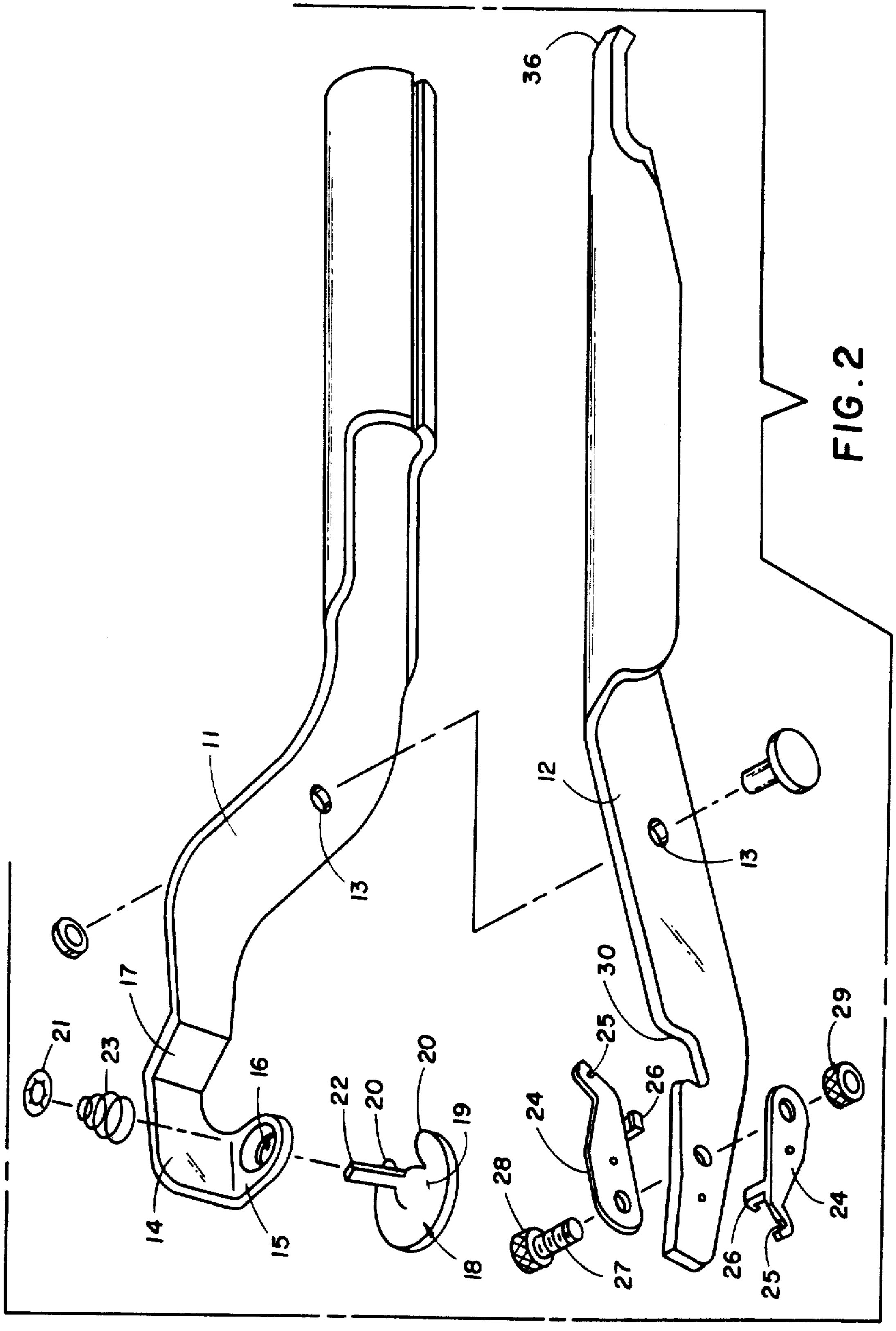
FIG. 2 is an exploded view of the brake spring pliers of FIG. 1.
Figure 3:
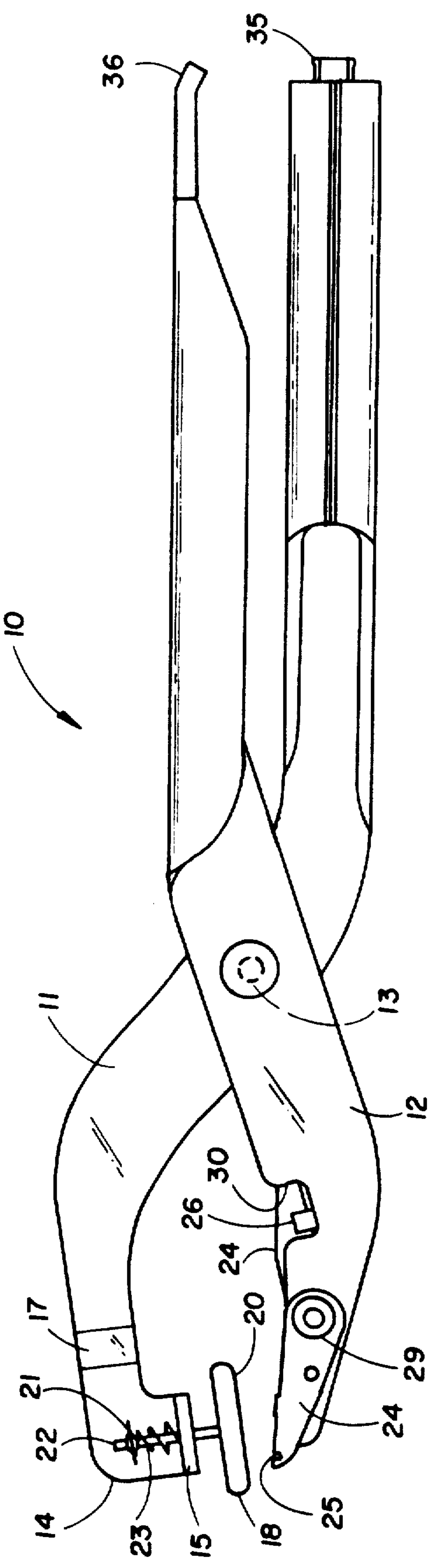
FIG. 3 is a side view of the brake spring pliers of FIG. 1.
Figure 4:
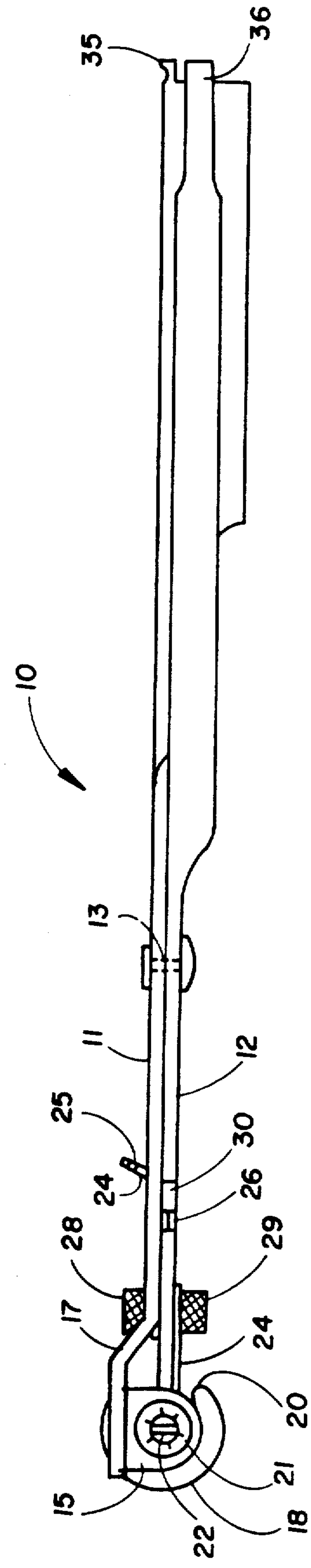
FIG. 4 is a top view of the brake spring pliers of FIG. 1.
Figure 5:
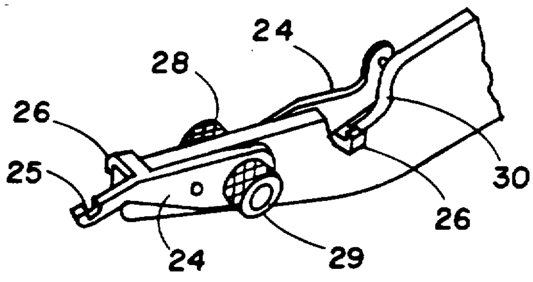
FIGS. 5 and 6 illustrate the selective adjustment of, respectively, the first and the second tips, so that the pliers may be utilized not only with old and new types of brake drums of varying sizes, but also so that the pliers may be utilized on the brake shoes on either side of the brake drum.
Figure 6:
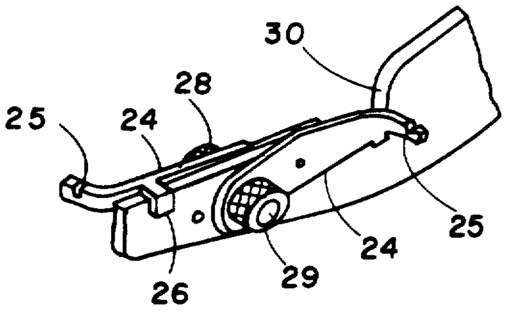

With further reference now to FIGS. 5 and 6, in addition to FIGS. 1-4, the forward end of the other of the arms 12 includes at least one tip 24. The tip 24 is pivotally joined to the arm 12 for pivotal movement of the tip 24 in opposite directions towards and away from the one of the arms 11, as noted by the arrows in FIGS. 5 and 6. In this fashion, the positioning of the tip 24 may be selectively adjusted, as desired, to readily adapt the pliers 10 for use on the two types of drum brakes as well as to adapt the pliers 10.

Preferably, two such tips (a first tip and a second tip) 24 are provided being disposed on opposite sides of the other of the arms 12. The provision of two such tips 24 permits the device 10 to be utilized on brake shoes located on both sides of the brake drum as shall be discussed at greater length below, with reference to FIGS. *7a*, *7b*, *8a* and *8b*.

Each of the tips 24 has a respective hook mean notch 25 formed therein. The hook means notches 25 are provided for engaging the brake spring being installed on or removed from the brake drum. Abutments (hooks) 26 are provided for limiting the pivotal movement of the tips 24 by hooking or otherwise abutting the other of the arms 12. Such an arrangement, the abutments (hooks) 26 also provide a means (or a stop) for further maintaining the tips 24 in position during use of the pliers 12.

Means is also provided for selectively securing the tips 24 in a selected pivoted position. Such means is provided by a threaded pin 27 that passes through respective apertures that are formed in a rearward portion of each of the tips 24, as well as through a bore that is form through the forward end of the other of the arms 12. A threaded nut 28 is disposed on the on an opposite of the forward end of the other of the arms 12 to threadably receive and engage therein the threaded pin 27 that has been disposed through the aperture(s) formed in the tip(s) 24 and the bore that is formed in the arm 12. In this manner, the pin 27 may be rotated in either a first loosening direction for permitting the tips 24 to be pivotally moved into the desired selected pivoted position or in a second tightening direction for securing the tips 24 in the desired selected pivoted position. Formed thusly, the tips 24 having the notches 25 and abutments (hooks) 26 thereon may be selectively, pivotally adjusted and secured in a desired position for use. Thus, it can be seen that the pliers 10 may be readily adjusted for use on all shoes of both and new type of brake drums of varying sizes.

It is preferred that a knurled knob 29 be carried on the end of the pin 27 that is opposite to that end of the pin 27 that is received in the nut 28. Knob 29 provides a handle that may be grasped by the user to facilitate the rotation of the pin 27, so that the positioning of the tips may be selectively adjusted, as described above. In this regard, if desired, the nut 28 may also be knurled to facilitate the gripping thereof.

As perhaps best seen in FIGS. 5 and 6, it is noted that the tips 24 are selectively adjusted, for the particular brake shoe being worked on. When one of the tips 24 is not required, it may be pivoted in the direction of the arrows towards the rearward end of the arm 12 where the abutment (hook) 26 thereof is received in (by hooking) and abuts a notch 30 that is formed in the arm 12. In this fashion, the tips 24 not being used in a particular operation may be moved into a position wherein the tip 24 is substantially flush with the arm 12, so that it will not interfere with the installation or removal operation that is being carried out by the use of the device 10.

The old style drums have the springs mounted on posts. The present invention is designed to enable the user to remove the spring from the post and to return the spring to the post. The rearward end of the arms 11 and 12 are adapted to facilitate removal and return of the spring about the respective post. The one arm 11 is enlarged to an increased diameter and the end of the arm 11 has a projection 35 extending outwardly therefrom. The diameter of the arm is large enough to receive the post therein and the projection 35 may engage the end of the spring to remove the spring from the post. The end of the other arm 12 is tapered and the inner side of the other arm 12, the side facing the one arm 11, has a groove therein. The spring is replaced by engaging the end of the spring on the other arm 12, disposing the post within the groove and lifting the other arm 12 so that the spring may slide off the other arm 12 and onto the post.

Having thus described the brake spring pliers 10 of the present invention, the use thereof is now described.

With reference now to FIGS. *7a* and *7b* the use of the brake spring pliers 10 for installing/removing a brake spring 3 and/or 5 of an old-style brake drum 1 is illustrated. In FIG. *7a*, the pliers 10 are seen being utilized to remove a brake spring 3 of one brake shoe 2 located on one side of the brake drum 1. In FIG. 7*b*, the same pliers 10 is seen being utilized to remove a brake spring 5 of another brake shoe 4 located on the other side of the brake drum 1. As can be seen, the particular tip 24 being used is selectively pivotally adjusted, so as to be in the particular most advantageous position desired. The particular tip 24 that is not being used is selectively pivoted rearwardly towards the rearward end of the arm 12, so that the abutment (hooks) 26 thereof is received in and abuts the notch 30 formed therein. The tightened pin 27 and nut 28 combination maintains these tips 24 in the selected desired positions discussed above where they will not interfere with the use of the pliers 10.

With reference now to FIGS. 8*a* and 8*b* the use of the brake spring pliers 10 for installing/removing a brake spring 3 and/or 5 of a new-style brake drum 1 is illustrated. In FIG. 8*a*, the pliers 10 is seen being utilized to remove a brake spring 3 of one brake shoe 2 located on one side of the brake drum 1. In FIG. 8*b*, the same pliers 10 is seen being utilized to remove a brake spring 5 of another brake shoe 4 located on the other side of the brake drum 1. As can be seen, the particular tip 24 being used is selectively pivotally adjusted, so as to be in the particular most advantageous position desired. The particular tip 24 that is not being used is selectively pivoted rearwardly towards the rearward end of the arm 12, so that the abutment (hook) 26 thereof is received in and abuts the notch 30 formed therein. The tightened pin 27 and nut 28 combination maintains these tips 24 in the selected desired positions discussed above where they will not interfere with the use of the pliers 10.

Obviously, many modifications may be made without departing from the basic spirit of the present invention. Accordingly, it will be appreciated by those skilled in the art that, within the scope of the appended claims, the invention may be practiced other than has been specifically described herein.

What is claimed is:

1. In a brake spring pliers for use with a brake spring and a brake lining, wherein a first plier arm and a second plier arm are pivotably joined together, the improvement which comprises a pair of mirror-image tips pivotably mounted to the first arm intermediately thereof, the tips being mounted laterally of the first arm and on opposite sides thereof, such that a selected one of the tips may be pivoted to an operational position forwardly of the first arm while the other tip is retracted to a storage position rearwardly of the first arm, means for selectively securing the tips in an interchangeably selected pivoted position with respect to one another such that the one of the tips may be in the forward operational position while the other tip is in the rearward storage position or the one of the tips may be in the rearward storage position while the other tip is in the forward operational position, each respective tip having an end, and hook means carried on the end of each respective tip engaging one end of the brake spring to alternately remove and install the spring, whereby the alternate use of the tips provides a "left hand" and a "right hand" facility for brake springs on left and right wheels, respectively.

2. The brake spring pliers of claim 1, wherein the means for selectively securing the tip in the selected pivoted position includes: each tip having a rearward portion having a hole formed therein, a hole formed in the first arm intermediately thereof wherein the holes in the respective tips may be aligned with the hole in the first arm, a pin having a pair of opposite threaded ends, the pin passing through the holes in the tips and the hole in the first arm; a pair of threaded knurled nuts, each nut disposed on opposite sides of the first arm, each nut being threadably received on a respective end of the threaded pin, whereby the nuts may be rotated in a first loosening direction for permitting the tips to be pivotally moved into the selected position, and in a second tightening direction for securing the tips in the pivotally selected position.

3. The brake spring pliers of claim 1, wherein each of the tips further includes a respective abutment formed thereon, whereby when the respective tip is pivoted to a desired position, the respective abutment engages and abuts the first arm, whereby further pivotal motion of the respective tip is prevented.

4. The brake spring pliers of claim 3, wherein a notch is formed in the first arm, intermediately thereof, the notch receiving the abutment of the respective tip in the storage position.

5. The brake spring pliers of claim 1, wherein the second arm has a forward end, a swivel foot carried by the forward end of the second arm, the swivel foot having a flat portion formed thereon, the swivel foot being load bearing for contacting, self-aligning and pressing against the brake lining whereby the brake lining is protected from damage when leverage is applied to the foot when the brake spring pliers are used to alternately remove and install the brake spring.

6. The brake spring pliers of claim 5, further comprising the second arm having a forward end having a right angle bend formed therein, so as to extend laterally of the second arm, the swivel foot being carried by the right angle bend such that the flat portion of the swivel foot is substantially parallel thereto; an opening formed in the forward end of the second arm near the right angle bend; a plate positioned substantially parallel to the swivel foot; a rod extending between and integral with the plate and the swivel foot, the rod further disposed extending through the opening in the forward end of the second arm and through the plate; a resilient biasing spring disposed surrounding the rod, the spring further disposed extending between and bearing against the forward end of the second arm and the plate, wherein the swivel foot may swivel about the opening in the forward end of the second arm.

7. In a brake spring pliers for use with a brake spring and a brake lining, wherein a first plier arm and a second plier arm are pivotably joined together, the improvement which comprises a pair of tips pivotably mounted to the first arm intermediately thereof, the tips being mounted laterally of the first arm and on opposite sides thereof, such that a selected one of the tips may be pivoted to an operational position forwardly of the first arm while the other tip is retracted to a storage position rearwardly of the first arm, each respective tip having an end, hook means carried on the end of each respective tip engaging one end of the brake spring to alternately remove and install the spring, whereby the alternate use of the tips provides a "left hand" and a "right hand" facility for brake springs on left and right wheels, respectively; means for selectively securing the tips in an interchangeably selected pivoted position with respect to one another such that the one of the tips may be in the forward operational position while the other tip is in the rearward storage position or the one of the tips may be in the rearward storage position while the other tip is in the forward operational position; wherein the means for selectively securing the tip in the selected pivoted position includes each tip having a rearward portion having a hole formed therein, a hole formed in the first arm intermediately thereof wherein the holes in the respective tips may be aligned with the hole in the first arm, a pin having a pair of opposite threaded ends, the pin passing through the holes in the tips and the hole in the first arm; a pair of threaded knurled nuts, each nut disposed on opposite sides of the first arm, each nut being threadably received on a respective end of the threaded pin, whereby the nuts may be rotated in a first loosening direction for permitting the tips to be pivotally moved into the selected position, and in a second tightening direction for securing the tips in the pivotally selected position; each of the tips further including a respective abutment formed thereon, whereby when the respective tip is pivoted to a desired position, the respective abutment engages and abuts the first arm, whereby further pivotal motion of the respective tip is prevented; a notch formed in the first arm, intermediately thereof, the notch receiving the abutment of the respective tip in the storage position; the second arm having a forward end, a swivel foot carried by the forward end of the second arm, the swivel foot having a flat portion formed thereon, the swivel foot being load bearing for contacting, self-aligning and pressing against the brake lining whereby the brake lining is protected from damage when leverage is applied to the swivel foot when the brake spring pliers are used to alternately remove and install the brake spring; a right angle bend formed in the forward end of the second arm, so as to extend laterally of the second arm, the swivel foot being carried by the right angle bend, such that the flat portion of the swivel foot is substantially parallel thereto; an opening formed in the forward end of the arm near the right angle bend; a plate positioned substantially parallel to the swivel foot; a rod extending between and integral with the plate and the swivel foot, the rod further disposed extending through the opening in the forward end of the second arm and through the plate; a resilient biasing spring disposed surrounding the rod, the spring further disposed extending between and bearing against the forward end of the second arm and the plate, wherein the swivel foot may swivel about the opening in the forward end of the second arm.

8. In an adjustable brake spring pliers for use with a brake spring and a brake lining including a pair of scissor-like arms, each arm having a forward end and a rearward handle end, the arms being joined together at a pivot point, so that the arms may be pivoted relative to one another in a first direction, wherein the forward ends of the arms are moved towards one another and in a second opposite direction, wherein the forward ends of the arms are moved away from one another; the improvement comprising a swivel foot carried by the forward end of one of the arms, the swivel foot having a flat portion formed thereon; a forward portion of said one arm being offset away from the other arm in said first direction, the forward end of said one arm having a right angle bend formed therein, so as to extend laterally of toward said other arm, the swivel foot being carried by the right angle bend, such that the flat portion of the swivel foot is substantially parallel said forward end; an opening formed in the forward end of said one arm near the right angle bend; a plate positioned substantially parallel to the swivel foot; a rod extending between and integral with the plate and the swivel foot, the rod further disposed extending through the opening in the forward end of said one arm and through the plate; a resilient biasing spring disposed surrounding the rod, the spring further disposed extending between and bearing against the forward end of said one arm and the plate, said opening being sufficiently larger than the rod to allow play between the rod and the perimeter of the opening such that the angle of the foot may change wherein the swivel foot may swivel about the opening in the forward end of said one arm and permit the foot to self-align when the foot is disposed on the brake lining, the swivel foot being load bearing for contacting and pressing against the brake lining whereby the brake lining is protected from damage when leverage is applied to the swivel foot when the brake spring pliers are used to alternately remove and install the brake spring.

9. In an adjustable brake spring pliers for use with a brake spring and a brake lining including a pair of scissor-like arms, each arm having a forward end and a rearward handle end, the arms being joined together at a pivot point, so that the arms may be pivoted relative to one another in a first direction, wherein the forward ends of the arms are moved towards one another and in a second opposite direction, wherein the forward ends of the arms are moved away from one another; the improvement comprising a swivel foot carried by the forward end of one of the arms, the swivel foot having a flat portion formed thereon, the swivel foot being load bearing for contacting and pressing against the brake lining whereby the brake lining is protected from damage when leverage is applied to the swivel foot when the brake spring pliers are used to alternately remove and install the brake spring; a pair of mirror-image tips pivotably mounted to the first arm intermediately thereof, the tips being mounted laterally of the other arm and on opposite sides thereof, such that a selected one of the tips may be pivoted to an operational position forwardly of the other arm while the other tip is retracted to a storage position rearwardly of the other arm; means for securing each tip in the selected pivoted portion with respect to one another; each respective tip having an end, and hook means carried on the end of each respective tip engaging one end of the brake spring to alternately remove and install the spring, whereby the alternate use of the tips provides a "left hand" and a "right hand" facility for brake springs on left and right wheels, respectively.

* * * * *